United States Patent
Zhu et al.

(10) Patent No.: US 11,301,095 B2
(45) Date of Patent: Apr. 12, 2022

(54) TOUCH SCREEN, METHOD FOR MANUFACTURING TOUCH SCREEN AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Shuncheng Zhu, Beijing (CN); Jing Wang, Beijing (CN); Xianlin Ding, Beijing (CN); Xiaodong Xie, Beijing (CN); Min He, Beijing (CN); Jian Tian, Beijing (CN); Dong Li, Beijing (CN); Qitao Zheng, Beijing (CN); Guiyu Zhang, Beijing (CN); Xinbin Tian, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 519 days.

(21) Appl. No.: 16/329,510

(22) PCT Filed: Jul. 20, 2018

(86) PCT No.: PCT/CN2018/096390
§ 371 (c)(1),
(2) Date: Feb. 28, 2019

(87) PCT Pub. No.: WO2019/052279
PCT Pub. Date: Mar. 21, 2019

(65) Prior Publication Data
US 2021/0333964 A1    Oct. 28, 2021

(30) Foreign Application Priority Data
Sep. 12, 2017 (CN) .......................... 201710818253.3

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/04164* (2019.05); *G06F 2203/04103* (2013.01)

(58) Field of Classification Search
CPC .............. G06F 3/04164; G06F 3/0446; G06F 2203/04103
(Continued)

(56) References Cited

U.S. PATENT DOCUMENTS

| | | |
|---|---|---|
| 2012/0013554 A1 | 1/2012 | Nam et al. |
| 2013/0050137 A1 | 2/2013 | Yang et al. |

(Continued)

FOREIGN PATENT DOCUMENTS

| | | |
|---|---|---|
| CN | 102339184 A | 2/2012 |
| CN | 102955631 A | 3/2013 |

(Continued)

OTHER PUBLICATIONS

PCT International Search Report, Application No. PCT/CN2018/096390, dated Oct. 19, 2018, 6 pages: with English translation.
(Continued)

*Primary Examiner* — Mark Edwards
(74) *Attorney, Agent, or Firm* — Armstrong Teasdale LLP

(57) ABSTRACT

Embodiments of the present disclosure provide a touch screen, a method for manufacturing a touch screen, and a display device. The method for manufacturing a touch screen including providing a substrate, forming a first conductive layer on the substrate, patterning, by using a first mask, the first conductive layer to form at least one first touch electrode, the first touch electrode including a first touch structure and a first wiring connected to the first touch
(Continued)

structure, forming a dielectric layer on the first conductive layer, forming a second conductive layer on the dielectric layer, and patterning, by using a second mask, the second conductive layer to form at least one second touch electrode, the second touch electrode including a second touch structure and a second wiring connected to the second touch structure.

11 Claims, 3 Drawing Sheets

(58) Field of Classification Search
USPC ........................................................ 345/156
See application file for complete search history.

(56) References Cited

U.S. PATENT DOCUMENTS

| 2015/0109245 | A1* | 4/2015 | Chou | .................... | G06F 3/0446 |
| | | | | | 345/174 |
| 2015/0189758 | A1* | 7/2015 | Kim | ..................... | C09D 161/06 |
| | | | | | 428/141 |
| 2016/0041647 | A1* | 2/2016 | Bae | ...................... | H05K 3/4644 |
| | | | | | 345/174 |
| 2016/0103548 | A1* | 4/2016 | Jun | ....................... | G06F 3/0412 |
| | | | | | 345/173 |
| 2016/0189582 | A1* | 6/2016 | Kang | .................... | G09G 3/006 |
| | | | | | 345/173 |

FOREIGN PATENT DOCUMENTS

| CN | 106919284 A | 7/2017 |
| CN | 107577373 A | 1/2018 |

OTHER PUBLICATIONS

PCT Written Opinion, Application No. PCT/CN2018/096390, dated Oct. 19, 2018, 5 pages.: with English translation of relevant part.
China First Office Action, Application No. 201710818253.3, dated Nov. 19, 2018, 12 pps.: with English translation.
China Second Office Action, Application No. 201710818253.3, dated May 31, 2019, 10 pps.: with English translation.

* cited by examiner

TOUCH SCREEN, METHOD FOR MANUFACTURING TOUCH SCREEN AND DISPLAY DEVICE

CROSS REFERENCE TO RELATED APPLICATIONS

This patent application is a National Stage Entry of PCT/CN2018/096390 filed on Jul. 20, 2018, which claims the benefit and priority of Chinese Patent Application No. 201710818253.3 filed on Sep. 12, 2017, the disclosures of which are incorporated by reference herein in their entirety as a part of the present application.

BACKGROUND

The present disclosure relates to the field of display techniques, and in particular, to a touch screen, a method for manufacturing touch screen, and a display device.

As a product for human-computer interaction, touch screens have been widely used in many fields such as production fields and life fields, especially in the field of consumer electronics fields (such as mobile phones, tablets, and even TVs).

Touch screen techniques mainly include resistive touch screens, capacitive touch screens, infrared touch screens, and surface acoustic wave touch screens. Capacitive touch screens are responsive, support multi-touch, and have a long life. They have become the mainstream technology on the market. The new generation of One Glass Solution (OGS) technology is a technology of directly forming a conductive film and a sensor on a protective glass, which enables one glass to simultaneously perform the dual role of protecting and sensing. Therefore, the OGS technology is the development trend of capacitive touch screens. However, the competition in the touch screen industry is becoming more and more fierce, which requires lowering production costs while improving the quality of the touch screens.

BRIEF DESCRIPTION

Embodiments of the present disclosure provide a touch screen, a method for manufacturing a touch screen, and a display device.

A first aspect of the present disclosure provides a method for manufacturing a touch screen. The method includes providing a substrate, forming a first conductive layer on the substrate, patterning, by using a first mask, the first conductive layer to form at least one first touch electrode, the first touch electrode including a first touch structure and a first wiring connected to the first touch structure, forming a dielectric layer on the first conductive layer, forming a second conductive layer on the dielectric layer, and patterning, by using a second mask, the second conductive layer to form at least one second touch electrode, the second touch electrode including a second touch structure and a second wiring connected to the second touch structure.

In an embodiment of the present disclosure, patterning, by using the first mask, the first conductive layer further forms an alignment mark.

In an embodiment of the present disclosure, forming the dielectric layer on the first conductive layer includes attaching the dielectric layer to the first conductive layer by using an adhesive layer.

In an embodiment of the present disclosure, patterning the first conductive layer forms at least two first touch electrodes, and patterning the second conductive layer forms at least two second touch electrodes, and the method further includes forming a protective layer on the second conductive layer, and cutting the substrate under the protection of the protective layer to form a plurality of sub-substrates, wherein each sub-substrate has one of the first touch electrode and one of the second touch electrode.

In an embodiment of the present disclosure, the first wiring and the second wiring are formed as extending to a bonding region on the substrate or the sub-substrate, and the method further includes forming, in the bonding region, a hole in the dielectric layer to expose the first wiring, and filling a conductive material in the hole to form a conductive via to the first wiring.

In an embodiment of the present disclosure, the method further includes bonding, on the bonding region, an integrated circuit chip to the first wiring and the second wiring.

In an embodiment of the present disclosure, a material of the first conductive layer and the second conductive layer includes a metal or a transparent conductive metal oxide.

In an embodiment of the present disclosure, the first touch structure and the second touch structure include a grid structure or a structure composed of a plurality of parallel lines.

A second aspect of the present disclosure provides a touch screen. The touch screen includes a substrate and a first conductive layer, a dielectric layer, and a second conductive layer sequentially arranged on the substrate. The first conductive layer includes at least one first touch electrode, and the first touch electrode includes a first touch structure and a first wiring connected to the first touch structure, and the second conductive layer includes at least one second touch electrode, and the second touch electrode includes a second touch structure and a second wiring connected to the second touch structure.

In an embodiment of the present disclosure, the touch screen further includes an adhesive layer for attaching the dielectric layer to the first conductive layer.

In an embodiment of the present disclosure, the first wiring and the second wiring are formed as extending to a bonding region on the substrate, and the dielectric layer in the bonding region has a conductive via to the first wiring.

In an embodiment of the present disclosure, the touch screen further includes an integrated circuit chip bonded to the first wiring and the second wiring.

In an embodiment of the present disclosure, a material of the first conductive layer and the second conductive layer includes a metal or a transparent conductive metal oxide.

In an embodiment of the present disclosure, the first touch structure and the second touch structure include a grid structure or a structure composed of a plurality of parallel lines.

A third aspect of the present disclosure provides a display device including any one of the touch screens described in the second aspect of the present disclosure.

Further adaptive aspects and scope will become apparent from the description provided herein. It should be understood that various aspects of the present application may be implemented alone or in combination with one or more other aspects. It should also be understood that the description and specific embodiments herein are intended to be illustrative and not limiting the scope of this application.

BRIEF DESCRIPTION OF THE DRAWINGS

The drawings described herein are only for illustrative purpose of selected embodiments rather than any possible implementation, and they are not intended to limit the scope of this application, in which.

DETAILED DESCRIPTION

Figure 1:
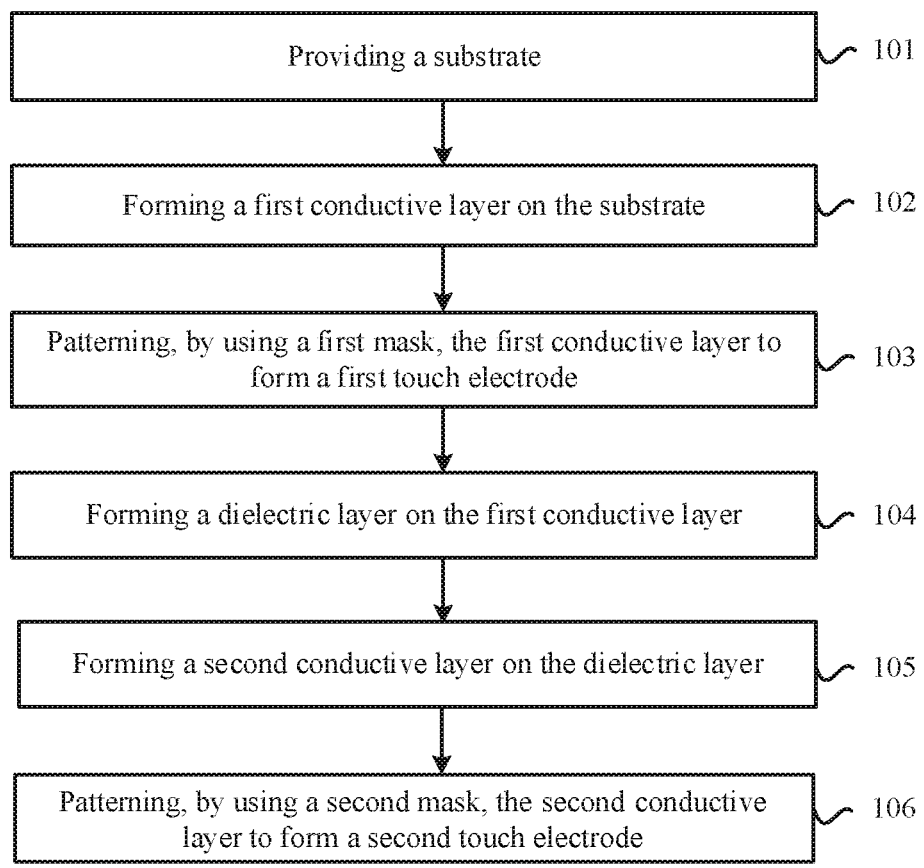
FIG. 1 illustrates a flow chart of a method for manufacturing a touch screen according to an embodiment of the present disclosure.

Various embodiments will now be described in detail with reference to the accompanying drawings, which are provided as exemplary examples of the disclosure to enable those skilled in the art to implement embodiments of the disclosure.

It is noted that the following drawings and examples are not meant to limit the scope of the disclosure. In the case that a particular element of the present disclosure may be implemented in part or in whole by using known components (or methods or processes), only parts of such known components (or methods or processes) required to understand the present disclosure will be described. The detailed description of the other parts of the known components will be omitted so as not to obscure the present disclosure. Further, the various embodiments are intended to encompass the present and future equivalents equivalent to the components referred to herein.

The flowchart depicted in the embodiments of the present disclosure is merely an example. Many variants of the flowchart or the steps described therein may exist without departing from the spirit of the present disclosure. For example, the steps may be performed in a different order, or steps may be added, deleted, or modified. These variants are considered to be part of the claimed aspect.

In the description of the present disclosure, the orientations or position relationship indicated by the terms "on", "above", "under", "below", "between", etc. are those illustrated based on the orientation or position relationship shown in the drawings. They are just used to facilitate and simplify the description of the present disclosure, rather than indicating or implying that any mentioned device or element must have a particular orientation, or be constructed or operated in a particular orientation, and hence cannot be understood as limitations to the present disclosure. In addition, when an element or layer is referred to as being "on" another element or layer, it may be directly located on the another element or layer, or there may be an intermediate element or layer; similarly, when an element or layer is referred to as being "under" another element or layer, it may be directly located under the another element or layer, or there may be at least one intermediate element or layer, and when an element or layer is referred to as being "between" two elements or layers, it may be an only element or layer between the two elements or layers, or there may be more than one intermediate element or layer.

Unless otherwise explicitly stated in the context, the singular form of a word used in present disclosure and the appended claims includes the plural thereof and vice versa. Thus, when a singular is mentioned, the plural of the corresponding term is usually included. Similarly, the terms "include", "comprise", "contain" and "have" and their grammatical variants are intended to be inclusive and indicate that elements other than those listed may be present. Where the term "example" is used in present disclosure, especially when it comes after a set of terms, the said "example" is merely illustrative and explanatory and should not be considered to be exclusive or extensive. The terms "first", "second", "third", etc. are used for the purpose of description only and are not to be construed as indicating or implying the relative importance and order of formation.

Generally, a touch screen using a conductive bridge touch structure may be manufactured by using five masks. The process using the five masks may include the following steps:

Step (1): forming a first touch electrode layer. The first touch electrode layer may include a plurality of spaced-apart conductive bridges. The material of the first touch electrode layer may be a transparent conductive metal oxide such as Indium Tin Oxide (ITO). The first touch electrode layer may be formed by processes such as magnetron sputtering, exposuring, developing, etching, and the like.

Step (2): forming a first insulating layer. The first insulating layer covers the conductive bridges. The first insulating layer may be formed by processes such as gluing, exposuring, developing, and the like.

Step (3): forming a second touch electrode layer. The second touch electrode layer may include a second touch electrode and a plurality of spaced-apart sub-electrodes. The adjacent sub-electrodes are connected together by the conductive bridge to form a first touch electrode. The second touch electrode layer may be formed by processes such as magnetron sputtering, exposuring, developing, etching, and the like.

Step (4): forming a signal transmission layer. The signal transmission layer includes a plurality of first wirings and a plurality of second wirings. The first wirings and the second wirings are respectively connected to the first touch electrode and the second touch electrode. The method for forming the signal transmission layer may be similar to the method for forming the first touch electrode layer and the second touch electrode layer, and the description thereof will not be repeated herein.

Step (5): forming a second insulating layer. The second insulating layer covers the first wirings to protect the first wirings. The method for forming the second insulating layer may be similar to the method for forming the first insulating layer, and the description thereof will not be repeated herein.

Thus, a touch screen was manufactured by the above method, and the manufacturing processes use five masks. Due to the high price of the masks, the cost of the touch screen is high and the manufacturing processes are complicated.

As to the above problems, embodiments of the present disclosure provide a method for manufacturing a touch screen. In this method, the touch screen may be manufactured by using only two masks. Since the number of masks is reduced, the cost for manufacturing the touch screen is reduced, and the manufacturing processes of the touch screen may be simplified.

Figure 2A:
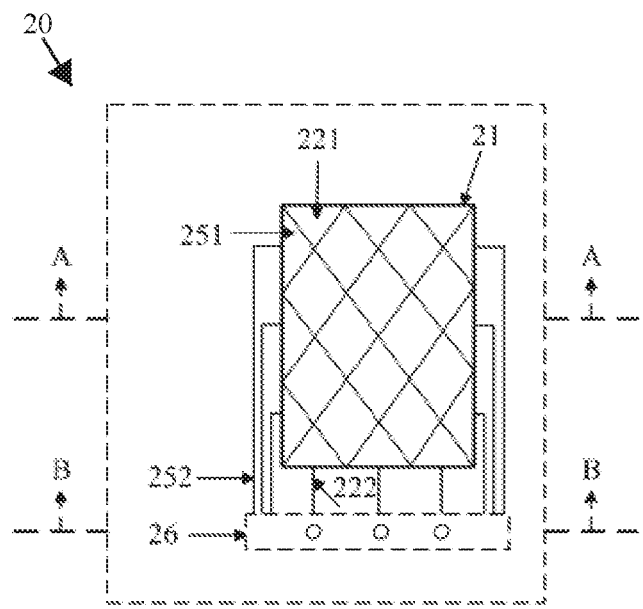
FIG. 2A illustrates a top view of a touch screen manufactured according to the method of the embodiment of the present disclosure.
Figure 2B:
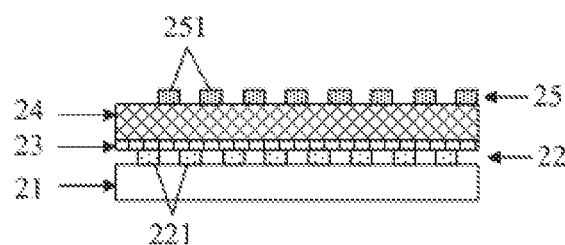
FIG. 2B illustrates a cross-sectional view taken at line A-A of the touch screen in FIG. 2A according to the embodiment of the present disclosure.
Figure 2C:
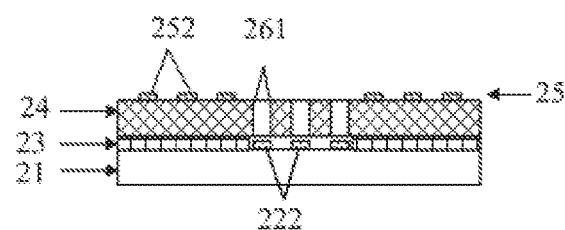
FIG. 2C illustrates a cross-sectional view taken at line B-B of the touch screen in FIG. 2A according to the embodiment of the present disclosure.
Figure 2D:
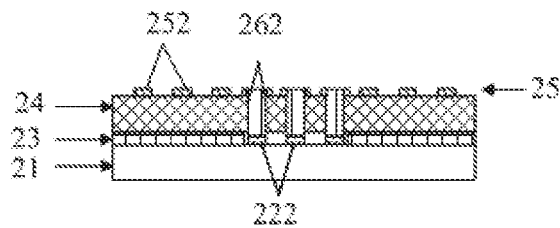
FIG. 2D illustrates a cross-sectional view taken at line B-B of the touch screen in FIG. 2A according to another embodiment of the present disclosure.

FIG. 1 illustrates a flow chart of a method for manufacturing a touch screen 20 according to an embodiment of the present disclosure. FIG. 2A illustrates a top view of the touch screen 20 manufactured according to the method of the embodiment of the present disclosure. FIG. 2B illustrates a cross-sectional view taken at line A-A of the touch screen 20 shown in FIG. 2A. FIG. 2C illustrates a cross-sectional view taken at line B-B of the touch screen 20 shown in FIG. 2A. FIG. 2D illustrates a cross-sectional view taken at line B-B of the touch screen 20 shown in FIG. 2A. The structure of the touch screen 20 and its manufacturing method will be described in detail below with reference to FIG. 1, FIG. 2A, FIG. 2B, FIG. 2C, and FIG. 2D.

The method for manufacturing the touch screen 20 may include the following steps:

S101: providing a substrate;

S102: forming a first conductive layer on the substrate;

S103: patterning the first conductive layer by using a first mask to form at least one first touch electrode. The first touch electrode includes a first touch structure and a first wiring connected to the first touch structure;

S104: forming a dielectric layer on the first conductive layer;

S105: forming a second conductive layer on the dielectric layer; and

S106: patterning the second conductive layer by using a second mask to form at least one second touch electrode. The second touch electrode includes a second touch structure and a second wiring connected to the second touch structure.

The foregoing steps will be further described below. In step S101, as shown in FIG. 2A, a substrate 21 is provided. The material of the substrate 21 may include glass or polymethyl methacrylate (PMMA). In addition, the material of the substrate 21 may also include other flexible materials to manufacture flexible touch screen 20.

In step S102, as shown in FIG. 2B, a first conductive layer 22 is formed on the substrate 21. According to an embodiment of the present disclosure, the first conductive layer 22 may be formed on the substrate 21 by, for example, a magnetron sputtering process. The material of the first conductive layer 22 may include at least one of a metal (such as at least one of Cu, Ag, Al, Ti, or Ni) or a transparent conductive metal oxide (such as ITO or the like).

In S103, in an example embodiment, the first conductive layer 22 is patterned using a first mask to form a first touch electrode. As shown in FIG. 2A, the first touch electrode may include a first touch structure 221 and a first wiring 222. The first touch structure 221 is used for sensing a touch to generate a touch signal. The first wiring 222 is connected to the first touch structure 221 to transmit the generated touch signal to perform touch recognition. According to an embodiment of the present disclosure, the first touch structure 221 may include, for example, a grid structure. According to an embodiment of the present disclosure, the first touch structure 221 and the first wiring 222 may be formed by a photolithographic process. The photolithographic process includes an exposure process, a development process, a hardening process, an etching process, and a film stripping process. The photolithographic process is a process known to those skilled in the art and will not be described in detail herein. According to an embodiment of the present disclosure, the line width of the first touch structure 221 may be about 2 microns to about 3 microns.

According to an embodiment of the present disclosure, when the first conductive layer 22 is patterned using the first mask to form the first touch electrode (i.e., in S103), an alignment mark (not shown) may also be formed. The alignment mark may be used to make the second touch structure 251 formed in the subsequent step have a desired relative positional relationship with the first touch structure 221.

In S104, as shown in FIG. 2B, a dielectric layer 24 is formed on the first conductive layer 22. According to an embodiment of the present disclosure, an adhesive layer 23 may be attached onto the first conductive layer 22. The dielectric layer 24 is adhered to the first conductive layer 22 through the adhesive layer 23. In an exemplary embodiment, the dielectric layer 24 may include polyethylene terephthalate and the adhesive layer 23 may include optical glue.

In S105, as shown in FIG. 2B, a second conductive layer 25 is formed on the dielectric layer 24. According to an embodiment of the present disclosure, the second conductive layer 25 may be formed on the dielectric layer 24 by, for example, a magnetron sputtering process. The material of the second conductive layer 25 may include at least one of a metal (such as at least one of Cu, Ag, Al, Ti, or Ni) or a transparent conductive metal oxide (such as ITO or the like).

In S106, in an exemplary embodiment, the second touch electrode is formed by patterning the second conductive layer 25 using the second mask based on the alignment mark. As shown in FIG. 2A, the second touch electrode may include a second touch structure 251 and a second wiring 252. The second touch structure 251 is used for sensing a touch to generate a touch signal. The second wiring 252 is connected to the second touch structure 251 to transmit the generated touch signal to perform touch recognition. According to an embodiment of the present disclosure, the second touch structure 251 may include, for example, a grid structure. According to an embodiment of the present disclosure, the second touch structure 251 and the second wiring 252 may be formed by photolithographic process. According to an embodiment of the present disclosure, the line width of the second touch structure 251 may be about 2 micrometers to about 3 micrometers.

It should be noted that, in the foregoing steps, a required number of first touch electrodes and second touch electrodes may be formed based on actual needs.

According to an embodiment of the present disclosure, when at least two first touch electrodes and at least two second touch electrodes are formed on the substrate 21, a protective layer (not shown) may also be formed on the second conductive layer 25. Then, the substrate 21 can be cut to form a plurality of sub-substrates under the protection of the protective layer. Each sub-substrate has one first touch electrode and one second touch electrode. In an example embodiment, the protective layer may include a peelable paste. The peelable paste may be formed on the second conductive layer 25 by, for example, screen printing.

According to an embodiment of the present disclosure, as shown in FIG. 2A, the first wiring 222 and the second wiring 252 may be formed as extending to a bonding region 26 of the substrate 21. According to an embodiment of the present disclosure, the adhesive layer 23 may have an opening region therein to expose the first wiring 222. According to an embodiment of the present disclosure, the method for manufacturing the touch screen 20 may further include, after forming the second touch electrode, forming holes 261 (as shown in FIG. 2C) in the dielectric layer 24 in the bonding region 26. The holes 261 may expose the first wiring 222. Then filling a conductive material in the holes 261 to form conductive via 262 (as shown in FIG. 2D) to the first wiring 222. In an example embodiment, the conductive material may include a conductive ink.

Additionally, the method for manufacturing the touch screen 20 may further include bonding an integrated circuit chip to the first wiring 222 and the second wiring 252 on the bonding region 26. Since the first wiring 222 extends to the bonding region 26 through the conductive via 262, the integrated circuit chip (not shown) is bonded onto the bonding region 26, which may realize the conductive connection between the integrated circuit chip and the first wiring 222 and the second wiring 252. According to an embodiment of the present disclosure, the integrated circuit chip may be bonded onto the bonding region 26 by a method such as hot pressing.

According to an embodiment of the present disclosure, when at least two first touch electrodes and at least two second touch electrodes are formed on the substrate 21, the integrated circuit chip may be bonded onto the first wiring 222 and the second wiring 252 after cutting the substrate 21 to form a plurality of sub-substrates.

As shown in FIG. 2A, the grid structure of the first touch structure 221 and the second touch structure 251 formed according to the above method has a diamond shape. It is easily recognized by those skilled in the art that the shape of the grid structure of the first touch structure 221 and the second touch structure 251 may also be a rectangle, a square, a hexagon, or other polygons.

Figure 3:
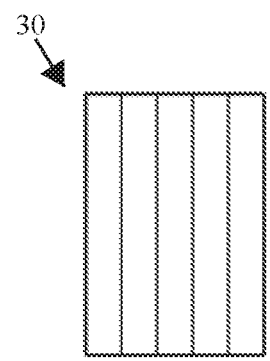
FIG. 3 illustrates a top view of a first touch structure and a second touch structure of a touch screen manufactured according to the method according to another embodiment of the present disclosure.

It should be noted that the first touch structure and the second touch structure may be a grid structure as shown in FIG. 2A. The first touch structure and the second touch structure may also be a structure 30 composed of a plurality of parallel lines as shown in FIG. 3. In addition, touch structure of the present disclosure is not particularly limited to the specific structure, and any structures that may implement the touch function may be applied to the present disclosure.

According to an embodiment of the present disclosure, when forming the touch screen 20, since the first touch structure 221 of the first touch electrode has the same material as the first wiring 222, the first touch electrode may be formed by patterning the first conductive layer 22 using the first mask. Similarly, since the second touch structure 251 of the second touch electrode has the same material as the second wiring 252, the second touch electrode may be formed by patterning the second conductive layer 25 using the second mask. Therefore, the touch screen 20 may be manufactured by using only two masks. Since the number of masks is reduced, the manufacturing cost of the touch screen is reduced, and the process for manufacturing the touch screen may be simplified.

In another aspect of the disclosure, a touch screen 20 manufactured by using the method described herein is provided. The structure of the touch screen 20 is shown in FIGS. 2A, 2B, 2C, and 2D. The touch screen 20 includes a substrate 21 and a first conductive layer 22, a dielectric layer 24 and a second conductive layer 25 which are sequentially arranged on the substrate 21. The first conductive layer 22 includes at least one first touch electrode. The first touch electrode may include a first touch structure 221 and a first wiring 222 connected to the first touch structure 221. The first touch structure 221 is used for sensing a touch to generate a touch signal. The first wiring 222 is connected to the first touch structure 221 to transmit the generated touch signal to perform touch recognition. The second conductive layer 25 includes at least one second touch electrode. The second touch electrode may include a second touch structure 251 and a second wiring 252 connected to the second touch structure 251. The second touch structure 251 is used for sensing a touch to generate a touch signal. The second wiring 252 is connected to the second touch structure 251 to transmit the generated touch signal to perform touch recognition. The first conductive layer 22 may further include an alignment mark (not shown), which may be used to have a desired relative positional relationship between the second touch structure 251 and the first touch structure 221. According to an embodiment of the present disclosure, the first touch structure 221 and the second touch structure 251 may include, for example, a grid structure.

In an embodiment of the present disclosure, the touch screen 20 may further include an adhesive layer 23 that may be used to attach the dielectric layer 24 onto the first conductive layer 22. The substrate 21 has a bonding region 26. There may be holes 261 (as shown in FIG. 2C) in the dielectric layer 24 in the bonding region 26. The holes 261 may be filled with a conductive material to form a conductive via 262 (as shown in FIG. 2D) to the first wiring 222. The touch screen 20 may further include an integrated circuit chip (not shown) bonded onto the bonding region 26 to implement a conductive connection with the first wiring 222 and the second wiring 252.

In an embodiment of the present disclosure, the material of the substrate 21 may include glass or polymethyl methacrylate (PMMA). In addition, the material of the substrate 21 may also include other flexible materials to make the touch screen 20 flexible. The material of the first conductive layer 22 and the second conductive layer 25 may include at least one of a metal (such as at least one of Cu, Ag, Al, Ti, or Ni) or a transparent conductive metal oxide (such as ITO or the like). The dielectric layer 24 may include polyethylene terephthalate, the adhesive layer 23 may include optical glue, and the conductive material may be a conductive ink.

In an embodiment of the present disclosure, the shape of the grid structure of the first touch structure 221 and the second touch structure 251 may be a diamond, a rectangle, a square, a hexagon, or other polygons. The line width of the first touch structure 221 and the second touch structure 251 may be about 2 micrometers to about 3 micrometers.

It should be noted that the first touch structure and the second touch structure may be a grid structure as shown in FIG. 2A. The first touch structure and the second touch structure may also be a structure 30 composed of a plurality of parallel lines as shown in FIG. 3. In addition, the present disclosure is not particularly limited to the specific structure of the touch structure, and any structures that may implement the touch function may be applied to the present disclosure.

The touch screen 20 may be manufactured by using only two masks. Since the number of masks is reduced, the manufacturing cost of the touch screen is reduced, and the process for manufacturing the touch screen may be simplified.

Figure 4:
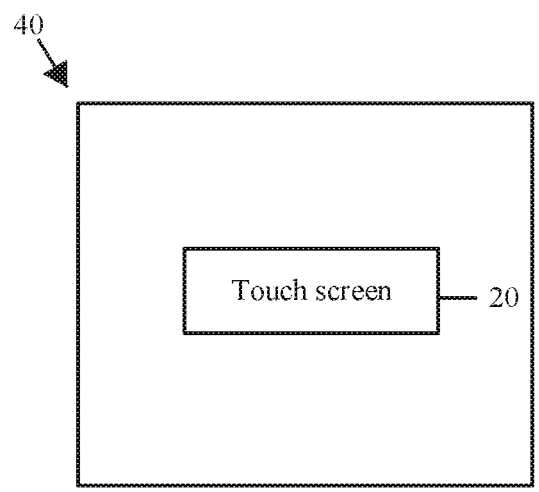
FIG. 4 illustrates a display device according to an embodiment of the present disclosure.

In yet another aspect of the present disclosure, as shown in FIG. 4, a display device 40 including a touch screen 20 is also provided. Since the touch screen 20 may be manufactured by using only two masks, the manufacturing cost of the display device 40 is reduced, and the process for manufacturing the display device 40 may be simplified.

The foregoing description of the embodiments has been presented for purposes of illustration and description. It is not intended to be exhaustive or to limit the disclosure. The various elements or features of a particular embodiment are generally not limited to the particular embodiment, but, where appropriate, these elements and features are interchangeable and may be used in the selected embodiments, even if not specifically illustrated or described. It may also be modified in many ways. Such modifications are not to be regarded as departing from the present disclosure, and all such modifications are included within the scope of the present disclosure.

What is claimed is:

1. A method for manufacturing a touch screen, the method comprising:
   providing a substrate;
   forming a first conductive layer on the substrate;
   patterning, using a first mask, the first conductive layer to form at least one first touch electrode, the first touch electrode comprising a first touch structure and a first wiring connected to the first touch structure;
   forming a dielectric layer on the first conductive layer;
   forming a second conductive layer on the dielectric layer;
   patterning, using a second mask, the second conductive layer to form at least one second touch electrode, the second touch electrode comprising a second touch structure and a second wiring connected to the second touch structure, wherein forming the dielectric layer on the first conductive layer comprises attaching the dielectric layer to the first conductive layer using an adhesive layer, wherein the adhesive layer has an opening region therein to expose the first wiring, and wherein the first wiring and the second wiring are formed as extending to a bonding region on the substrate or a sub-substrate;
   forming, in the bonding region, a hole in the dielectric layer to expose the first wiring;
   filling a conductive material in the hole to form a conductive via to the first wiring; and
   bonding, on the bonding region, an integrated circuit chip to the first wiring and the second wiring, wherein the integrated circuit chip is bonded onto the first wiring through the conductive via, wherein a thickness of the dielectric layer is greater than a thickness of each of the adhesive layer, the first conductive layer, and the second conductive layer, wherein the dielectric layer comprises polyethylene terephthalate, and wherein the conductive material comprises a conductive ink.

2. The method according to claim 1, wherein patterning, using the first mask, the first conductive layer further forms an alignment mark.

3. The method according to claim 1, wherein patterning the first conductive layer forms at least two first touch electrodes, wherein patterning the second conductive layer forms at least two second touch electrodes, and wherein the method further comprises forming a protective layer on the second conductive layer, and cutting the substrate under protection of the protective layer to form a plurality of sub-substrates, wherein each sub-substrate has one of the at least one first touch electrode and one of the at least one second touch electrode.

4. The method according to claim 1, wherein a material of the first conductive layer and the second conductive layer comprises one of a metal and a transparent conductive metal oxide.

5. The method according to claim 1, wherein the first touch structure and the second touch structure comprise one of a grid structure and a structure composed of a plurality of parallel lines.

6. A touch screen comprising:
   a substrate;
   a first conductive layer, a dielectric layer, and a second conductive layer sequentially arranged on the substrate, wherein the first conductive layer comprises at least one first touch electrode, wherein the first touch electrode comprises a first touch structure and a first wiring connected to the first touch structure, wherein the second conductive layer comprises at least one second touch electrode, and wherein the second touch electrode comprises a second touch structure and a second wiring connected to the second touch structure;
   an adhesive layer for attaching the dielectric layer onto the first conductive layer, wherein the adhesive layer has an opening region therein to expose the first wiring, wherein the first wiring and the second wiring are formed as extending to a bonding region on the substrate, and wherein the dielectric layer in the bonding region has a conductive via to the first wiring; and
   an integrated circuit chip bonded to the first wiring and the second wiring, and wherein the integrated circuit chip is bonded onto the first wiring through the conductive via, wherein a thickness of the dielectric layer is greater than a thickness of each of the adhesive layer, the first conductive layer, and the second conductive layer, wherein the dielectric layer comprises polyethylene terephthalate, and wherein a conductive material comprises a conductive ink.

7. The touch screen according to claim 6, wherein a material of the first conductive layer and the second conductive layer comprises one of a metal and a transparent conductive metal oxide.

8. The method according to claim 6, wherein the first touch structure and the second touch structure comprise one of a grid structure and a structure composed of a plurality of parallel lines.

9. A display device comprising the touch screen according to claim 6.

10. The method according to claim 3, wherein the first wiring and the second wiring are formed as extending to a bonding region on the substrate or the sub-substrate, the method further comprising:
    forming, in the bonding region, a hole in the dielectric layer to expose the first wiring; and
    filling a conductive material in the hole to form a conductive via to the first wiring.

11. The method according to claim 10, further comprising bonding, on the bonding region, an integrated circuit chip to the first wiring and the second wiring.

* * * * *